United States Patent

[11] 3,576,282

[72] Inventors August P. Epina, Jr.; Vladimir Nejezchleb, Boulder; Sidney H. Smith, Broomfield, Colo.

[21] Appl. No. 837,796
[22] Filed June 30, 1969
[45] Patented Apr. 27, 1971

[73] Assignee International Business Machines Corporation Armonk, N.Y.

[54] PNEUMATICALLY BIASED TAPE LOADING
10 Claims, 2 Drawing Figs.

[52] U.S. Cl. ........ 226/7, 226/97
[51] Int. Cl. ........ G11b 23/12
[50] Field of Search ........ 226/7, 95, 97; 242/182, 185

[56] References Cited

UNITED STATES PATENTS 2,980,355 4/1961 Cannings ........ 242/185
3,091,409 5/1963 Goodale ........ 226/97X
3,202,373 8/1965 Reader ........ 242/182
3,384,317 5/1968 Bukovich et al. ........ 226/97
3,512,692 5/1970 Horton ........ 226/97X

*Primary Examiner*—Allen N. Knowles
*Attorneys*—Hanifin & Jancin and Herbert F. Somermeyer

ABSTRACT: Magnetic-recording tape disposed on a rotatable spool in a cartridge is pneumatically loaded into first and second tape storage chambers. The first chamber is adjacent the tape exit portion of the cartridge and vacuum in such first chamber tends to pull the tape thereinto to the exclusion of the second chamber. To cause a tape loop to be formed in the second storage chamber, the second chamber (remote from the exiting portion of the cartridge) has an enlarged opening creating a greater pneumatic force to thereby attract the tape thereinto to the exclusion of the first chamber. Yieldable limiting means are provided in the second chamber as a reduced cross-sectional portion wherein the tape attracting force is equalized between the two storage chambers. Thereafter, the tape is loaded into the first chamber to the exclusion of the second chamber.

INVENTORS
AUGUST P. EPINA, JR.
VLADIMIR NEJEZCHLEB
SIDNEY H. SMITH
BY
ATTORNEY

PNEUMATICALLY BIASED TAPE LOADING

CROSS-REFERENCE TO RELATED APPLICATIONS

Application for U.S. Pat. Ser. No. 790,710, filed Jan. 13, 1969, in the name of Paul J. Badum and Vladimir Nejezchleb and assigned to the assignee of the present invention discloses a record-processing system using the teachings of the present invention.

BACKGROUND OF THE INVENTION

This invention relates to flexible magnetic tape or web record storage and processing apparatus, and more particularly, to improvements for initially positioning such flexible magnetic tape or web in a record-processing apparatus.

In magnetic memory systems employing flexible movable record members, it is desirable that signal processing commence at a predetermined index point on the record member. Such index point is ordinarily at one end or the other of the usable portion of the record member. As a part of the operation in which the record member is loaded in a given processing apparatus, such index point is desirably brought immediately adjacent a signal transducer such that signal processing can commence without additional delay or confusion. In a usual magnetic tape storage system, for example, tape is usually threaded from its storage or payout reel through a transport apparatus. Then the tape is moved until a "beginning of tape" marker is detected by a sensing means in the transport apparatus. Detection of such mark indicates to a control mechanism associated with the transport apparatus that the tape or record member is in proper position for signal processing (i.e., the relationship of the tape to the transducer is at one end, usually the beginning, of the record member's usable record portion).

In the movable record-processing system disclosed in the above-mentioned Badum et al. patent application, the requirement for initially positioning the movable record member at a predetermined index point also exists. The usable recording portion of the record member in the above-referred-to system is that portion which is translatable past a transducer by a drive means while the opposite ends of the movable record member remain fixed to the cartridge. Such record member is loaded by pneumatically urging the entire usable recording portion into a pair of storage chambers, often in the form of vacuum columns. The position of the index point identifying one end (i.e., the beginning) of the usable recording portion is a function of how much of such record member is transported into the respective storage chambers.

In loading a record member or tape into two storage columns, usually there is a tendency for the tape to load entirely into one of the two storage chambers with no tape entering the other storage chamber. This problem arises from the fact that, as the tape is unspooled from the cartridge, it first passes an opening of the one storage chamber before reaching the other storage chamber. Assuming that equal vacuum is applied to the two storage chambers, the tape is first urged by pneumatic pressures into the one column. In other words, the one column offers lesser resistance to tape movement; therefore, there is a tendency for all of the tape to be loaded in that one storage chamber. It is a purpose of the present invention to ensure forming a loop of predetermined size of the tape record member in the storage chamber usually not receiving any of the tape with the remainder of the usable portion of the record member being transported into the one storage chamber such that the above-mentioned index point will always initially be positioned in the immediate proximity of a transducer.

SUMMARY OF THE INVENTION

It is a primary object of the present invention to provide an improved magnetic tape-transporting apparatus which enables pneumatic loading into a pair of storage chambers with predetermined size loops in each of the chambers such that an index point is always in a predetermined relationship to a transducer operatively associated with the record member.

Apparatus employing the present invention include a pair of tape or record member storage chamber having pneumatic urging therein. A tape is unloaded from a spool into a plenum in communicative relationship with the two storage chambers. The arrangement is such that, as the tape is unspooled, it passes a first opening a of a first storage chamber (for example, a vacuum column) thereby tending to unspool entirely into said first storage chamber to the exclusion of the other or second storage chamber (for example, a vacuum column). The second storage chamber has an enlarged second opening and receives the same vacuum as the first chamber to exert a greater attracting pneumatic force on the record member; thereby initially causing the record member to form a loop into the second storage chamber. Limiting means are provided for equalizing the attracting force between the two chambers such that, after a predetermined size loop is formed in the second storage chamber, the tape unspools into the first storage chamber. Such enlarged second opening and limiting means cooperate as means for exerting a greater pneumatic urging on the tape for a limited initial period of loading to form a loop of predetermined size in the record storage chamber. The transducer to be operatively associated with the record member then has a predetermined relationship to an index point on the tape in one of the two storage chambers.

The foregoing and other objects, features and advantages of the invention will be apparent from the following more particular description of a preferred embodiment of the invention, as illustrated in the accompanying drawings.

DETAILED DESCRIPTION OF THE ILLUSTRATED EMBODIMENT

Figure 1:
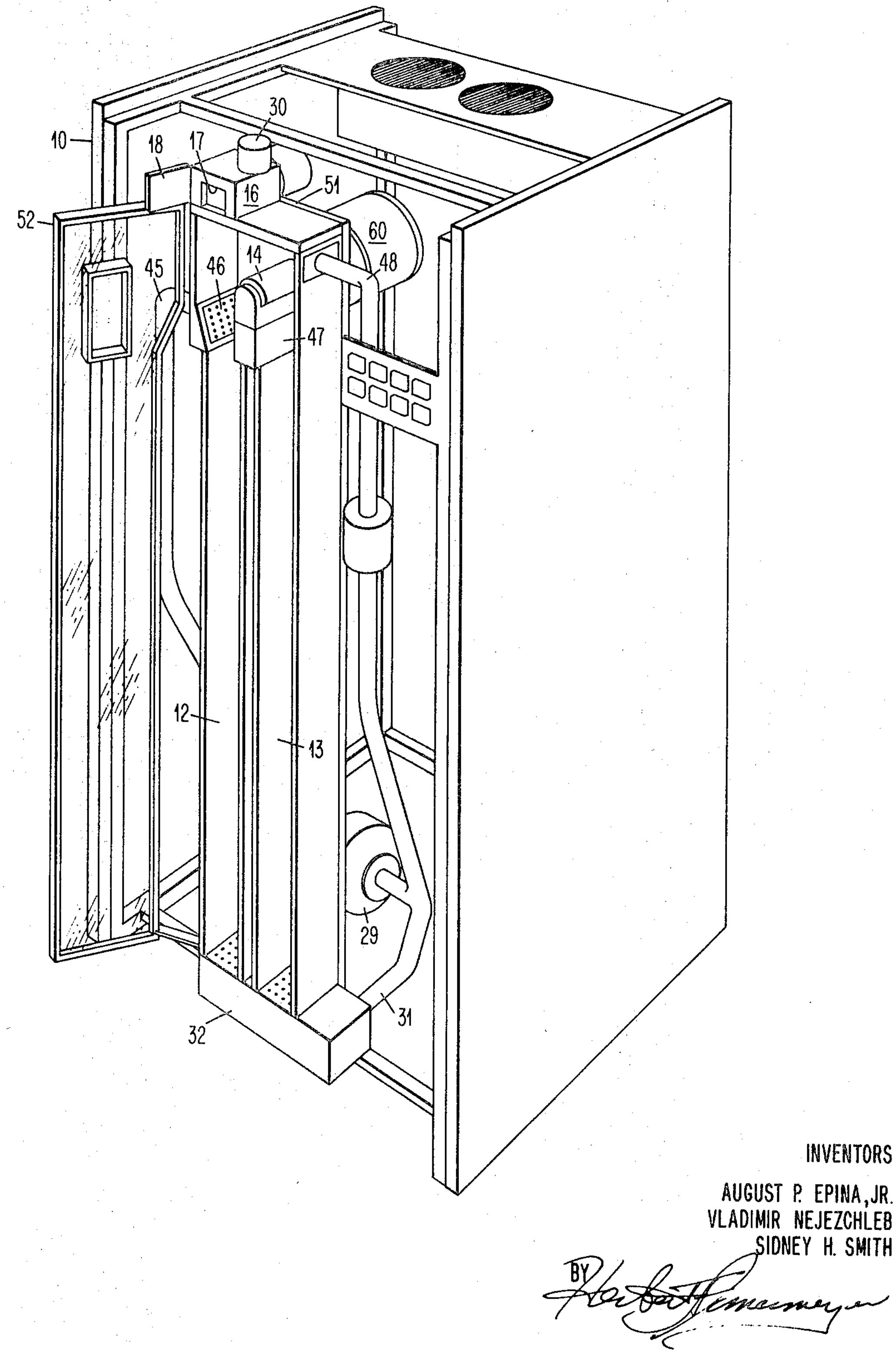
FIG. 1 is a simplified diagrammatic showing an isometric view of a tape-transporting apparatus employing the teachings of the present invention.

With more particular reference to the appended drawings, like numerals indicate like parts and structural features in the two views.

Housing 10 encloses and supports tape apparatus to be described. The tape transport includes a pair of vacuumized tape storage chambers or columns 12 and 13 having a capstan 14 disposed between the storage chamber upper and open end portions. The magnetic tape 20 used in the apparatus is contained in a cartridge 15 shown as being removably supported within enclosure 16 at the upper end of the tape-processing apparatus. Cartridge 15 may be inserted into enclosure 16 through opening 17 which is closable by hinged door 18. Other loading means (not shown) and techniques may be used to manually or automatically place cartridge 15 in the illustrated operative position. The cartridge may be either manually or automatically inserted. Magnetic-recording tape 20 has one end securely affixed to the cartridge lid 21 which is hinged to the cartridge box proper at 22. The other end of tape 20 is securely affixed to spool 23 which is rotatably secured to opposite ends (not shown) of cartridge 15. With lid 21 closed, tape 20 is rolled up on spool 23.

It is appreciated that the length of tape spoolable into cartridge 15 is limited; even at that, the total cross-sectional storage surface area can still be quite large since substantial tape widths may be provided. For example, in one constructed embodiment, magnetic-surfaced tape had a length of 130 inches with a width of 2.7 inches. Compare this with ½-inch wide tape. Because of the unique arrangement of the record-processing system and the facile means of loading the tape into the tape-processing system, as will be described, over 100 inches of such tape was made available for magnetic recording of data signals. In such a tape capable of having 128 tracks 100 inches long with a bit packing density of about 5,000 bits per inch in each track, sixty-four million bit cells are provided on the recording or record usable portion. This storage capacity corresponds to eight million bytes in each storage container or cartridge 15 when the magnetic recording tape 20 was shuttled between the tape storage chambers 12 and 13 at a speed of only 200 inches per second and with four tracks being processed simultaneously during each such shuttling of the tape, a data storage transfer rate of four million bits per second (0.5 million bytes per second) was provided. Increased performance is attained by modifying tape speed and the like.

It is understood that the particulars of the data signal formating on the magnetic-recording tape 20, the bit and track densities and related matters are details not addressable by the present invention. It is important to note that, with the facile automatic tape-loading arrangement provided, tape widths substantially greater than those employed in the well-known magnetic tape transport systems are usable such that large storage capacity is provided. The storage transfer rate may be enhanced by providing both reading and writing operations in either direction.

After cartridge 15 has been inserted into enclosure 16 with the lid 21 closed, a sensor (not shown) indicates to a processing control unit (not shown) that the tape is ready to be loaded into the later-described tape-processing apparatus. Solenoid 30 is actuated by the control unit to release lid 21 which then rapidly moves downwardly to the illustrated position. See the above-cited patent application for more details.

Figure 2:
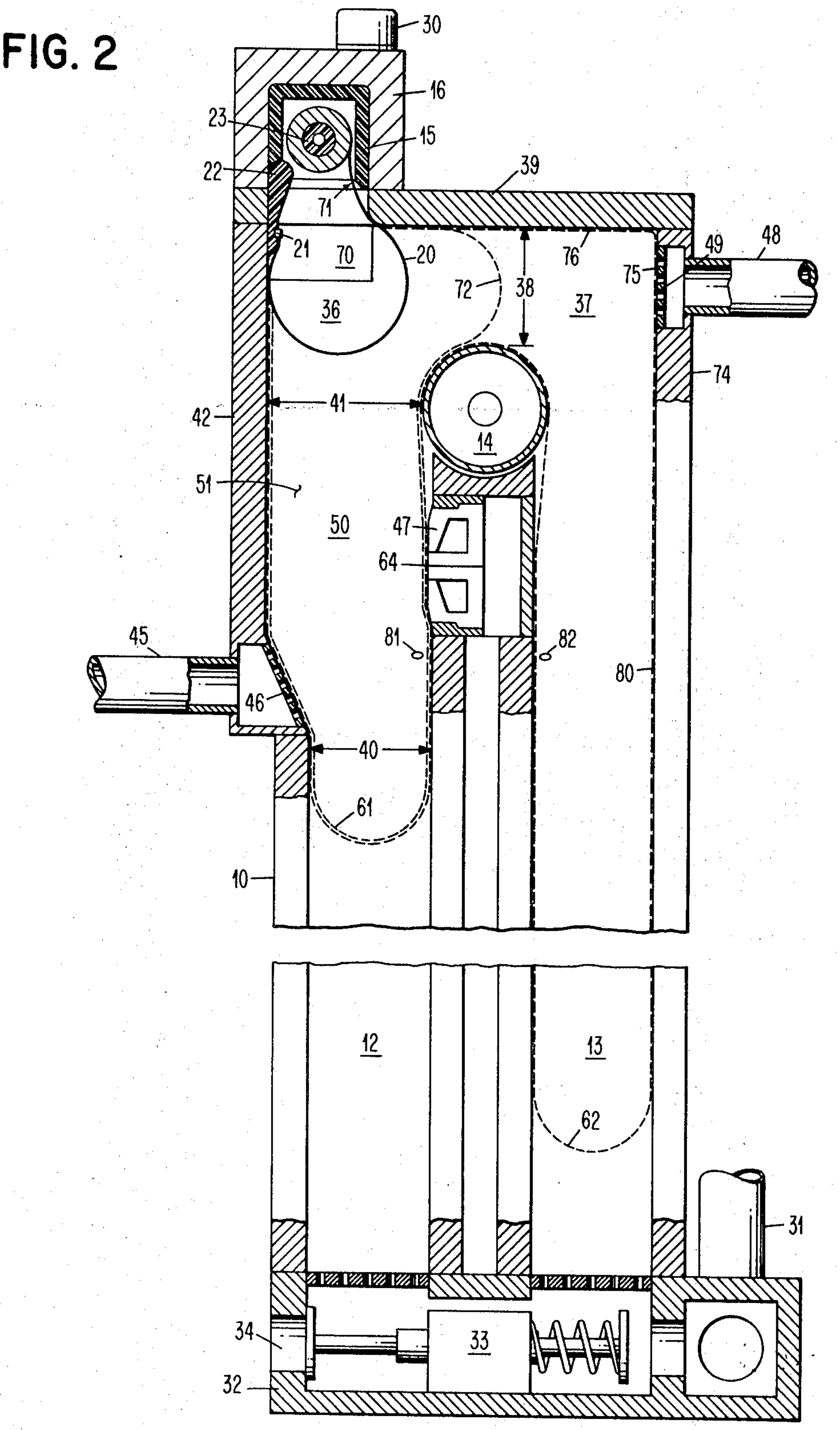
FIG. 2 is a simplified diagrammatic cross-sectional view of the storage chambers and plenum of the FIG. 1 illustrated apparatus and including a diagrammatic illustration of the tape positions in various stages of unspooling the tape from the spool and loading same into two storage chambers.

As lid 21 rotates about its rotatable joint 22, tape 20 is moved downwardly and unspooled as shown in the solid line in FIG. 2. It may be noted that the spool 23 is rotatably supported in cartridge 15 by antifriction bearings. A bearingless cartridge may be provided, requiring a secure engagement between spool 23 and antifriction bearings which are rotatably secured to housing 10.

Before proceeding further with the unloading description, the tape-processing apparatus will be described in detail. The tape-processing apparatus includes a chamber which is evacuated to a low vacuum by vacuum source 29 in communicative relationship to the tape storage chambers 12 and 13 through pneumatic tubing 31 and the valving arrangement within lower plenum chamber 32. Vacuum source 29 may be a blower exhausting air to the atmosphere from chambers 12 and 13. Solenoid actuated valve assembly 33 alternately permits communicative relationship from tape storage chambers 12 and 13 to or through aperture 34 to the atmosphere. During the loading of tape 20 into storage chambers 12 and 13 and subsequent tape-processing operations, valve assembly 33 is actuated to the illustrated position by a control unit (not shown). The columnar tape storage chambers 12 and 13 are in communicative interrelationship at the upper end thereof via upper tape loading plenum 36. Column 13 has short ell portion 37 at the upper end thereof ending in opening 38. Opening 38 extends between the upper portion of cylindrical capstan 14 and chamber upper wall 39. Tape storage chamber 12 has a widened portion beginning at 40 and extending upwardly to its opening at 41. Opening 41 extends between sidewall 42 and the capstan 14. The two tape storage chambers 12 and 13 shown in side-by-side relationship have immediately adjacent openings 38 and 41 providing fluid communication to tape-unloading plenum 36.

While right-angled tape storage chamber openings 38 and 41 are illustrated, no limitation thereto is intended. A continued reading will later disclose the desired operational relationship between magnetic-recording tape 20, tape-unloading plenum 36, and adjacent openings 38 and 41.

At the outer wall and upper ends of the respective tape storage chambers, there are provided two vacuum actuated tape latches 46 and 49. In tape storage chamber 12, conduit 45 is connected to apertured plate 46 which provides airflow therethrough from storage chamber 12 to the vacuum source or blower 29 (FIG. 1). The purpose of the pneumatic latch is to position tape 20 with respect to magnetic-transducing head 47. In a similar manner, pneumatic tube 48 is connected through apertured plate 49 to the upper end portion of tape storage chamber 13.

Signal-processing transducer 47 is shown as being immediately below cylindrical drive capstan 14 and facing into tape storage chamber 12 upper widened portion 50. The tape-receiving surface of transducer 47 is shown as being substantially flush with the sidewall surface of tape storage chamber 12. It is permissible to have the transducer 47 protrude somewhat into the tape storage chamber. A satisfactory, flush-mounted transducer is disclosed in U.S. Pat. No. 3,327,916, issued June 27, 1967, to J. A. Weidenhammer et al. In some instances, it may be desirable to have transducer 47 on the opposite side of the tape from the tape engagement with respect to driving capstan 14. The purpose of this latter arrangement is to enable capstan 14 to engage the plastic or insulating side of the tape rather than the magnetic oxide coated surface of the tape as required in the illustrated embodiment. In such an instance, transducer 47 would be mounted on the backwall 51 such that it could move perpendicular to the plane of the drawing of FIG. 2 to engage the oxide coating on tape 20. Also, it may be made to pivot thereinto or it may have a number of tracks, for example, 4 or 8, and then be reciprocated transversely to the length of tape 20 for reading all 128 channels or tracks thereof, or whatever number is provided.

For convenience, front wall 52 of the processing apparatus is hinged as best seen in FIG. 1, such that access to the tape-processing chambers for maintenance and other purposes is conveniently provided. Capstan 14 is selectively driven by motor 60 in both directions such that tape 20 selectively shuttles back and forth between chambers 12 and 13.

It is desired when tape 20 is initially loaded into tape storage chambers 12 and 13, that dotted line indicated tape loop 61 be formed in chamber 12 and the remainder of tape 20 be loaded into tape storage chamber 13, as indicated by dotted line 62. The index or reference point of tape 20 is positioned at 64 on tape 20. In loading tape 20 from cartridge 15 into tape storage chambers 12 and 13, there is a tendency of tape 20 to be drawn into chamber 13 to the exclusion of chamber 12. The apparent reason is that, as best seen in FIG. 2, as the tape 20 is unspooled from spool 23 (spool 23 rotates clockwise) it first passes opening 38. Since the vacuum applied to tape storage chambers 12 and 13 is equal, as indicated by the common communicative relationship through plenum 32, tape 20 is first attracted by the vacuum in chamber 13. Such attractive force causes tape 20 to move toward apertured plate 49 and thence unspool tape 20 from spool 23 into chamber 13. Another factor tending to cause tape 20 to load into tape chamber 13 is the frictional drag of capstan 14 as the tape enters chamber 12. That is, during tape loading, capstan 14 is stationary to exert drag on the tape as it moves toward chamber 12. No such drag is exerted on tape entering storage chamber 13.

The invention solves the above-described dilemma by causing a momentary extra attracting force at opening 41 of tape storage chamber 12 to initially form predetermined size loop 61 and thence permit the remainder of tape 20 to be loaded into tape storage chamber 13. After the tape is completely unspooled from the spool 23, drive capstan 14 under control of motor 60 and a control unit (not shown) shuttles tape 20 between the two chambers 12 and 13 for enabling signal processing to or from tape 20 via transducer 47.

The advantages of the present invention are better understood by observing the tape loading sequences from spool 23 into the two tape storage chambers 12 and 13. As explained above, when lid 21 is rotatably opened, the initial movement causes tape 20 to unspool from spool 23 as shown by the solid line in FIG. 2. At this point in the loading sequence, the vacuum control valve 33 has opened such that a vacuum of equal pressure is applied to both storage chambers 12 and 13. Since the upper end portion of tape storage chamber 12 is enlarged with respect to the opening 38 of tape storage chamber 13, there is a greater attraction of the tape to tape storage chamber 12.

Tape 20 has a width sufficient to substantially reach from between the front and rear walls of the plenum 36. As such, tape 20 forms a flexible diaphragm of variable area (as it unspools) between opening 70 (a source of atmospheric pressure) in the backwall of the tape-processing chambers and the two tape storage chambers 12 and 13. Differential pressure across the tape 20, caused by vacuum source 29 and aperture 70 to the atmosphere, is sufficient to unspool same out of cartridge 15. Because of the larger total force at opening 41, tape 20 is initially urged downwardly into enlarged upper end portion 50. This greater attracting force exists throughout the length of enlarged upper end portion 50.

Immediately after the initial opening of cartridge 15, vacuum is applied to pneumatic tube 45. This vacuum attracts tape 20 to apertured plate 46 and causes it to latch thereonto. Tape 20 continues to load into storage chamber 12 until the cross-sectional area thereof filled by tape 20, as at 40, equals the cross-sectional area of opening 38 of storage chamber 13. At this time, the vacuum attracting forces are equal; however, since tape is exiting cartridge 15 in exit portion 71, it is first exposed to the vacuum force at opening 38. Since the now equal vacuum force at 40 in tape storage chamber 12 is more remote from the source of tape 20 at 71 than the pneumatic attracting vacuum force at opening 38, the unspooling tape 20 moves through opening 38 as indicated by dotted line 72. Movement of tape 20 into storage chamber 13 in the above-described manner occurs only after tape 20 has formed the loop indicated by dotted line 61 in chamber 12, which is of any predetermined size such that index or starting point 64 resides in the immediate proximity of transducer 47. As tape 20 continues to unspool from cartridge 15, it is loaded into tape storage chamber 13 until the entire usable length of tape 20 is moved out of cartridge 15.

The above-described arrangement of adjacent openings 38 and 41, enlarged portion 50, reduced opening 40 with equal vacuum in columns or storage chambers 12 and 13 comprise a yieldable tape loop limiting means. That is, tape loop 61 is formed in enlarged portion 50 and limited thereto by the yieldable limiting means. However, when tape 20 is urged by cylindrical drive capstan 14, it removes the limiting to cause a larger tape loop to be formed in storage chamber 12.

After the tape has been loaded into chamber 13, a vacuum is applied through pneumatic tube 48 to apertured plate 49. This vacuum causes tape 20 to move against the outer wall 74 as indicated by dotted line 75. This additional vacuum also causes the tape to be snug against the upper wall 39 as indicated by dotted line 76. If vacuum is prematurely applied through apertured plate 49, such vacuum could interfere with tape 20 loading into tape storage chamber 13. Apertured plates 49 and 46 with the applied vacuum act as tape latches; that is, those portions of the tape between the latches 46 and 49 and the tape cartridge 15 are stationarily associated with the processing chamber. The portions between the latches (i.e., the portions loaded into chambers 12 and 13) may be shuttled back and forth by capstan 14. The intermediate or recording portion of the tape 20 resides between point 64, or the beginning point, and a point on tape 20 initially on wall 74 of storage chamber 13 downwardly from point 80 on wall 74, a distance equal to the tape length from point 64 to sensing aperture 82. This marks the end of the data recording portion.

For convenience, sensing means 81 and 82 in the form of apertures are provided on backwall 51 of the tape-processing chambers. In the event tape 20 is transported above aperture 82 in chamber 13, a stop motor signal is applied to motor 60 to prevent the capstan 14 from driving the tape further. This arrangement prevents the positive acting capstan from driving tape 20 completely into storage chamber 12. In a similar manner, aperture 81 being bypassed by tape 20 as it is transported toward storage chamber 13 may actuate a sensor (not shown) of the pneumatic sensing type for stopping the motor 60 from overdriving the tape into storage chamber 13. Of course, it is understood other limiting means may be provided as by a transparent portion in the tape with photosensors and the like.

Upon completion of tape processing, valve assembly 33 is moved to the right for removing the vacuum from storage chambers 12 and 13. Then the vacuum from pneumatic tube 48 is removed and motor driven device 60 engages spool 23 and rotates same counterclockwise, as seen in FIG. 2, for respooling the tape onto spool 23. After the tape has moved into cartridge 15, the vacuum may then be removed from pneumatic tube 45. As the tape is wound up, the end affixed to lid 21 is pulled up for closing cartridge 15. Cartridge 15 may then be removed for storage such that another cartridge may be inserted into enclosure 16 for processing its tape by the illustrated apparatus.

While the invention has been illustrated and described with respect to a tape having extreme ends fixedly secured to cartridge 15, no limitation thereto is intended. For example, two spools (not shown) may be provided wherein one spool supplies tape across the upper end of plenum 36. When the end of the tape is attached to a takeup spool (not shown), a pressure may be applied over the aperture 70 forcing a loop of the tape to be supplied into plenum chamber 36 as indicated by the solid line 20 in FIG. 2. The loading of such a tape into the tape storage chambers 12 and 13 may be as above-described with the tape being supplied as described herein. The adjacent openings 38 and 41 may lie in the same plane rather than being in right-angled planes. Also, as a certain portion of the tape is processed, the tape may be removed from the storage chambers 12 and 13 onto a takeup reel and another section of tape loaded into storage chambers 12 and 13. In this manner, a single spool may provide several processing portions for the illustrated tape-processing apparatus with the loading provided by pneumatic means into the processing apparatus. An endless or closed-loop tape may be loaded using this invention.

While the invention has been described with particularity in connection with a simple preferred embodiment, other constructions easily lie within the scope of the invention. Some of the other embodiments are more expensive to construct and operate, the application of a greater urging on the tape for a limited period of loading may take advantage of constructional features not used in our preferred embodiment. As an example, assume that widened opening 41 is not provided. An extra urging force for establishing a loop of predetermined size may be formed in chamber 12 by momentarily providing a greater vacuum therein until loop 61 has been formed. Another construction would be to momentarily rotate capstan 14 during a limited period of the tape loading to form loop 61. Capstan 14 rotation supplies such extra urging by frictional engagement with tape 20. Both these latter embodiments require control circuitry (not shown) adding to the expense thereof. The described preferred embodiment provides a more facile tape loading.

It should be appreciated that, while the present invention has been described and illustrated with respect to a magnetic tape system, other forms of record processing may be utilized. Such other forms include optical storage, surface deformation, or other techniques. The transducers utilized in such a processing system would be compatible with the recording form.

While the invention has been particularly shown and described with reference to a preferred embodiment thereof, it will be understood by those skilled in the art that various changes in form and details may be made therein without departing from the spirit and scope of the invention.

We claim:

1. An automatic tape-loading apparatus, including the combination:

a pair of tape storage chambers having first and second immediately adjacent openings;

a plenum chamber enclosing both of said openings and having a third opening opposite said adjacent openings;

tape supply means disposed on said plenum opposite said adjacent openings and adapted to supply a loop or tape into said plenum and supplying said tape first toward said first opening and then toward said second opening such that said closed loop separates said third opening from said adjacent openings;

pressure differential means including vacuum means in communicative relationship with said storage chambers and said third opening for creating a pressure differential across said tape for urging said tape supply means to supply tape under urging on said tape from said pressure differential means; and means for exerting a greater force of attraction on said tape at said second opening for a limited period of tape supply such that a loop of predetermined size is formed in said tape storage chamber at said second opening.

2. An automatic elongated web loading apparatus;

first and second web storage chambers having adjacent openings for removably receiving said elongated web;

a plenum chamber common to said adjacent openings;

web supply means adjacent said plenum chamber and adapted to initially place a web into said plenum such that said web forms a flexible fluid movement-retarding diaphragm in said plenum forming two chamber portions therein and further adapted to supply said web into said plenum past said adjacent openings of said first storage chamber before the other;

fluid pressure means in communicative relationship with said chambers to establish a pressure differential between said plenum chamber portions for forcing said web toward said storage chambers;

the improvement including the combination:

said first storage chamber having a smaller opening than said second storage chamber for exerting a lesser attracting force on said web than said second storage chamber such that a loop of said web is formed in said second storage chamber; and means for establishing an equal web attracting force in said storage chambers after a predetermined size loop of said elongated web is formed in said second storage chamber such that said first chamber then receives the web supplied from said tape supply means.

3. The apparatus of claim 2, wherein said adjacent openings are substantially at a right angle with the apex of said angle being intermediate said web storage chambers and said web supply means disposed at said plenum chamber opposite said apex.

4. The apparatus of claim 3, wherein said fluid pressure means causes a substantially equal and constant pressure in both said storage chambers.

5. The apparatus of claim 4, wherein said second storage chamber has an enlarged upper end portion extending from the opening thereof to said means for establishing an equal web-attracting force.

6. The apparatus of claim 5, wherein said means for establishing an equal web-attracting force includes an inwardly extending shoulder at a lower end of said enlarged upper end portion such that the cross-sectional area of said second storage chamber is substantially the same size as said adjacent opening of said first storage chamber.

7. An automatic tape-loading apparatus, including the combination:

a pair of tape storage chambers situated in a side-by-side relationship and respectively having immediately adjacent openings;

a plenum in common communicative relationship to said openings;

tape supply means on said plenum opposite to said openings and adapted to supply a tape into said plenum with the tape being supplied toward a first one of said openings;

pneumatic means in communicative relation to said plenum and said tape storage chambers for establishing an equal pressure differential between said storage chambers and said plenum immediately adjacent said tape supply means whereby said tape is urged through said openings to form a loop into said first one of said openings because of the proximity of the tape supply means thereto; and the other one of said tape storage chambers having an enlarged opening for providing an increased pressure differential force such that, as the tape supply means supplies tape, a predetermined sized loop is formed in said other one of said storage chambers and yieldable limit means in said other one of said storage chambers for yieldably limiting the size of the loop therein such that a loop is subsequently formed in said storage chamber having said first opening.

8. The apparatus of claim 7, further including capstan drive means disposed intermediate said adjacent openings and capable of being in a driving engagement with said tape for overriding said yieldable limiting means for supplying a greater portion of said tape into said other storage chamber greater than said predetermined sized loop.

9. The apparatus of claim 8, wherein said adjacent openings are at substantial right angles with said capstan drive means at the apex of such angle;

said one storage chamber having an upper ell portion, vacuum latch means in each said storage chambers for holding said tape securely between said cartridge and said latches during any tape-processing operations; and means for processing signals to and/or from said tape.

10. The method of loading an elongated web into first and second storage chambers wherein said second storage chamber has a greater resistance to web insertion than said first storage chamber such that said web tends to be loaded into said first storage chamber to the exclusion of said second storage chamber, the method including the steps of simultaneously and equally urging the web into said storage chambers such that the web tends to load into said first storage chamber, and while continuing said simultaneous and equal urging exerting a greater urging on said web to load into said second storage chamber until a loop of said web having a predetermined size is loaded thereinto.